United States Patent
Read et al.

(10) Patent No.: US 11,384,028 B2
(45) Date of Patent: Jul. 12, 2022

(54) INTERNAL COOLING CIRCUITS FOR CMC AND METHOD OF MANUFACTURE

(71) Applicant: United Technologies Corporation, Farmington, CT (US)

(72) Inventors: Kathryn S. Read, Marlborough, CT (US); Andrew J. Lazur, Laguna Beach, CA (US)

(73) Assignee: Raytheon Technologies Corporation, Farmington, CT (US)

( * ) Notice: Subject to any disclaimer, the term of this patent is extended or adjusted under 35 U.S.C. 154(b) by 57 days.

(21) Appl. No.: 16/785,182

(22) Filed: Feb. 7, 2020

(65) Prior Publication Data

US 2020/0346983 A1 Nov. 5, 2020

Related U.S. Application Data

(60) Provisional application No. 62/843,133, filed on May 3, 2019.

(51) Int. Cl.
*C04B 37/00* (2006.01)
*C04B 35/80* (2006.01)
*C04B 35/117* (2006.01)

(52) U.S. Cl.
CPC ............ *C04B 37/001* (2013.01); *C04B 35/80* (2013.01); *C04B 37/008* (2013.01); *C04B 2235/5256* (2013.01); *C04B 2235/604* (2013.01); *C04B 2237/38* (2013.01); *C04B 2237/55* (2013.01); *C04B 2237/62* (2013.01)

(58) Field of Classification Search
CPC . C04B 37/001; C04B 37/008; C04B 2237/38; C04B 2237/55
See application file for complete search history.

(56) References Cited

U.S. PATENT DOCUMENTS

| | | | |
|---|---|---|---|
| 5,225,015 A * | 7/1993 | Allaire | C03B 11/14 156/155 |
| 5,439,627 A * | 8/1995 | De Jager | B22F 1/0059 264/129 |
| 5,916,510 A | 6/1999 | Jessen | |
| 6,627,019 B2 | 9/2003 | Jarmon et al. | |
| 6,746,755 B2 | 6/2004 | Morrison et al. | |
| 8,202,588 B2 | 6/2012 | Keller et al. | |
| 8,257,809 B2 | 9/2012 | Morrison et al. | |
| 10,011,043 B2 | 7/2018 | Gray et al. | |
| 10,017,425 B2 | 7/2018 | Tuertscher et al. | |
| 2005/0077341 A1 | 4/2005 | Larrieu et al. | |

(Continued)

FOREIGN PATENT DOCUMENTS

EP 2134542 A2 12/2009

OTHER PUBLICATIONS

Extended European Search Report for EP Application No. 20172590.0, dated Sep. 15, 2020, 8 pages.

*Primary Examiner* — Alex B Efta
(74) *Attorney, Agent, or Firm* — Kinney & Lange, P.A.

(57) ABSTRACT

A method for forming a ceramic matrix composite (CMC) component with an internal cooling channel includes forming a first fiber member, forming a first depression in a surface of the first fiber member, covering the first depression with a second fiber member to form a near-net shape fiber preform of a component with an internal channel defined in part by the first depression, and densifying the fiber preform.

18 Claims, 4 Drawing Sheets

(56) References Cited

U.S. PATENT DOCUMENTS

| | | | |
|---|---|---|---|
| 2008/0199661 A1* | 8/2008 | Keller | B32B 3/08 |
| | | | 428/188 |
| 2009/0139808 A1* | 6/2009 | Bouchard | D04H 18/02 |
| | | | 188/218 XL |
| 2016/0115086 A1* | 4/2016 | Tuertscher | C04B 35/62884 |
| | | | 264/29.1 |
| 2016/0214356 A1* | 7/2016 | Sheedy | C04B 35/563 |
| 2016/0214907 A1* | 7/2016 | Shim | C04B 41/81 |
| 2017/0009600 A1 | 1/2017 | Grasso et al. | |
| 2017/0101873 A1* | 4/2017 | Morgan | C04B 35/573 |
| 2017/0268344 A1 | 9/2017 | Dasgupta et al. | |
| 2018/0223681 A1 | 8/2018 | Gallier et al. | |
| 2018/0272568 A1 | 9/2018 | Parolini et al. | |
| 2018/0328189 A1 | 11/2018 | Frey et al. | |

\* cited by examiner

INTERNAL COOLING CIRCUITS FOR CMC AND METHOD OF MANUFACTURE

CROSS-REFERENCE TO RELATED APPLICATION(S)

This application claims the benefit of U.S. Provisional Application No. 62/843,133, filed May 3, 2019 for "INTERNAL COOLING CIRCUITS FOR CMC AND METHOD OF MANUFACTURE" by K. Read and A. Lazur.

BACKGROUND

The present disclosure relates generally to the manufacture of components for a gas turbine engine and more particularly to the manufacture of ceramic matrix composite (CMC) components with integral cooling channels.

Lightweight CMC is a highly desirable material for gas turbine engine applications. CMCs exhibit excellent physical, chemical, and mechanical properties at high temperatures, making CMCs particularly desirable for producing hot section components. Cooling the components to maintain appropriate operating temperatures is critical to the performance, durability, and function of the component.

In conventional metal components, a core material is removed to provide cooling channels. Methods for providing integral complex cooling circuits in CMCs are needed.

SUMMARY

A method for forming a ceramic matrix composite (CMC) component with an internal cooling channel includes forming a first fiber member, forming a first depression in a surface of the first fiber member, covering the first depression with a second fiber member to form a near-net shape fiber preform of a component with an internal channel defined in part by the first depression, and densifying the fiber preform.

The present summary is provided only by way of example, and not limitation. Other aspects of the present disclosure will be appreciated in view of the entirety of the present disclosure, including the entire text, claims and accompanying figures.

DETAILED DESCRIPTION

Cooling ceramic matrix composite (CMC) components to maintain appropriate operating temperatures is critical to the performance, durability, and function of the component. The present disclosure provides a method for manufacturing CMCs with complex internal cooling passages and cooling features. One or more channels are formed in a surface of a first fiber member and subsequently covered with a second fiber member to form a near net shape preform of the component with one or more internal cooling passages defined by the channels and the second fiber member. The resulting near net shape preform can be densified while maintaining the internal cooling passages to form a component with internal cooling. Components formed using the disclosed method can include but are not limited to hot section components of a gas turbine engine, such as turbine blades, vanes, seals, and platforms, and combustor panels.

Figure 1:
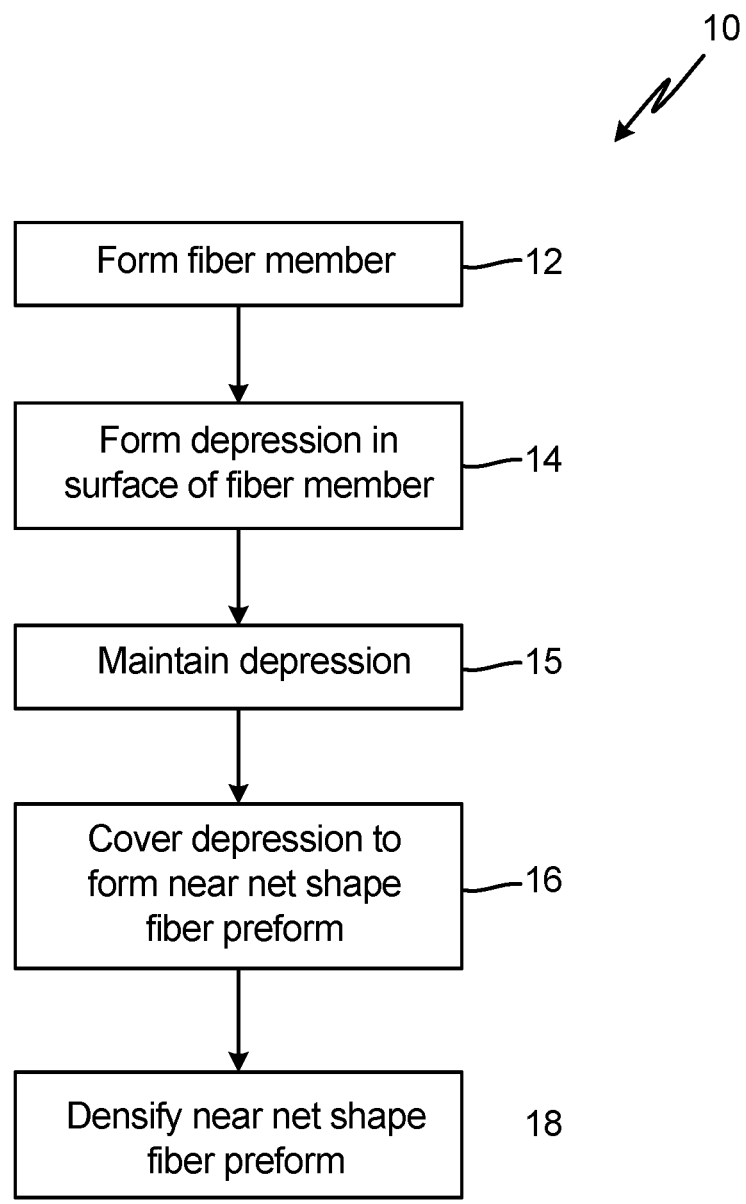
FIG. 1 is a flow chart of a method for forming a ceramic matrix composite component with an internal cooling channel.

FIG. 1 is a flow chart of method 10 for forming a CMC component with an internal cooling channel or circuit. Method 10 includes multiple embodiments, some of which are illustrated in FIGS. 2-6. A first fiber member is formed in step 12. The first fiber member is a three-dimensional (3D) arrangement of fiber tows and can be formed from an undensified 3D weave; undensified plurality of stacked two-dimensional (2D) woven, braided, or unidirectional fiber plies; or a unidirectional or multi-directional fiber prepreg as known in the art. Suitable fiber materials include, but are not limited to carbon, silicon carbide (SiC), alloyed and/or zirconium carbide, hafnium carbide, aluminum silicate, alumina, glass ceramic, and other materials suitable for high temperature operation. Interface coatings, such as boron nitride, can be applied to the fibers before or after a layup process to protect fibers from oxidation during component operation.

One or more depressions defining channels are formed in a surface of the first fiber member in step 14. One or more channels can be provided in one or more surfaces of the first fiber member to form cooling passages or cooling circuits, which will form the internal cooling passages of the final component. Channels can be formed by depressing a surface of the first fiber member. Formation of channels is described further with respect to FIGS. 2-6. Channels can be of any geometry, size, and connectivity based on the component cooling requirements and can be maintained in a final densification process of the fiber preform with or without the use of a temporary mandrel or tool. In some embodiments, an additional step 15 can be taken to maintain channels during densification, including but not limited to stitching, needling, application of temporary or permanent binders, continued use of a shaping tool or mandrel, and combinations thereof. Channels can open to one or more ends of the first fiber member or can be confined to an inner portion of the surface of the first fiber member such that channels are fully enclosed within the near net shape fiber preform. Channels opening to one or more ends of the first fiber member can remain open or can be plugged or covered in a subsequent step.

Once the one or more channels are formed, the channels are covered or capped with a second fiber member in step 16 to form a near net shape preform with internal passages defined by the second fiber member and the channels. The second fiber member can also be formed from an undensified three-dimensional (3D) weave; undensified single or plurality of stacked two-dimensional (2D) woven, braided, or unidirectional fiber plies; or a unidirectional or multi-directional fiber prepreg. The second fiber member can form and overwrap around the first fiber member or can be disposed on the surface of the first fiber member in which the one or more channels are formed. The second fiber member can have a substantially flat surface positioned to adjoin the surface of the first fiber member to form passages defined by the channels and second fiber member. In some embodiments, one or more channels can be formed in the second fiber member in a manner consistent with that disclosed for forming channels in the first fiber member. Channels in the second fiber member can be aligned with the one or more channels of the first fiber member upon assembly. In alternative embodiments, channels in the second fiber member can be offset from the channels of the first fiber member (e.g., arranged parallel to but spaced apart completely or partially from channels in the first fiber member or arranged in an alternative orientation such as, but not limited to, perpendicular to channels in the first fiber member). In some embodiments, channels in the second fiber member can be located on a surface opposite the surface adjoining the first fiber member and can be covered by a third fiber member to provide channels at different depths in the component. In some embodiments, more than two fiber members having channels can be stacked to provide channels at different depths. It will be understood by one of ordinary skill in the art that the orientation, number, and shape of channels in fiber members can vary and are not limited to the embodiments illustrated.

In some embodiments, an overwrap material can be used to cover channels of multiple adjoining fiber members, as disclosed in Patent Application No. 62/803,255, which is incorporated by reference herein in its entirety. Fiber members can be held in place by the overwrap, mechanical connection, temporary or permanent adhesive or preceramic polymer. In some embodiments, adjoining surfaces can be roughened to promote adhesion, or grooves can be machined in one surface to match an angle of the fiber in the adjoining surface such that the fibers can nest in the grooves creating a mechanical lock. Alternatively, chopped fibers can be disposed between adjoining surfaces to increase a bond formed between fiber members with densification. The thickness of the second fiber member or number of layers of the overwrap material covering the channels can vary depending on the desired location of the cooling passages in the final component relative to the surface of the component.

The resulting near net shape fiber preform is densified with a ceramic matrix in step 18. Final densification can be conducted using chemical vapor infiltration (CVI), precursor infiltration and pyrolysis (PIP), slurry infiltration, melt infiltration (MI), and combinations thereof, with care taken to avoid filling the cooling channels. Matrix materials can include, but are not limited to SiC, alumina, boron carbide, and carbon. Matrix material can densify the fiber members and/or fiber overwrap, while maintaining the internal passages formed by the channels. In some embodiments, an additional thermal or chemical treatment can be used to remove temporary or fugitive materials (e.g., temporary channel shaping tools and adhesives).

Apertures connecting the cooling channels to a source of cooling fluid and film cooling holes connecting the cooling channels to an outer surface of the component can be formed through the densified component using conventional machining techniques including but not limited to ultrasonic machining and laser drilling. Additional manufacturing steps, including but not limited to finishing machining, heat treatment, and application of environmental or thermal barrier coatings can be conducted to provide a final densified component.

Figure 2:
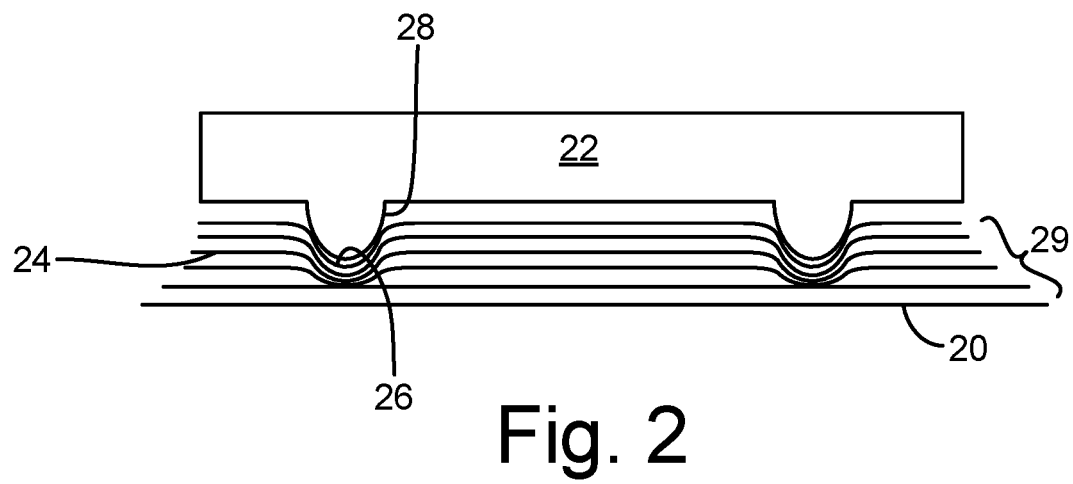
FIG. 2 is a schematic view of a fiber member and mold for forming channels.

FIGS. 2-6 illustrate different methods for forming and maintaining channels in the surface of the fiber member and formation of the near net shape fiber preforms. FIG. 2 provides a schematic view of fiber member 20 with mold 22. Fiber member 20 can be formed from a plurality of woven, braided, or unidirectional 2D fiber plies 24. In alternative embodiments, fiber member 20 can be formed from a 3D weave. One or more channels 26 can be pressed into a face or surface of fiber member 20 with mold 22, which has protrusions 28 matching a desired channel geometry. As mold 22 presses into fiber member 20, ends 29 of fiber plies 24 are displaced inward and fiber plies are compacted in the regions of channels 26. Mold 22 can consist of hard tooling made from polymers, metals, composites or combinations thereof. In some embodiments, a polymer, salt, or other temporary "positive" channel (e.g., large diameter nylon piece) can be inserted into first fiber member 20 and/or a second fiber member to form channel 26. The temporary channel member can removed before, during, or after densification (e.g., by melting, leaching, burning, etc.). In some embodiments, first fiber member 20 can be partially or fully densified with mold 22 in place to maintain cooling channels 26 and then removed before channels are covered with the second fiber member. Mold 22, which can be graphite, stainless steel, or other material suitable for maintaining channels 26 during a densification process, can be secured to first fiber member 20 for densification. For example mold 22 positioned on a top surface of first fiber member 20 can be fastened to a second tool (not shown) on an opposite side of first fiber member 20 to secure first fiber member 20 therebetween. The densification process can include CVI, PIP, MI, or slurry infiltration, or combinations thereof.

In alternative embodiments, mold 22 can be removed prior to densification. In some embodiments, shear force between plies 24 can be sufficient to maintain cooling channels once mold 22 has been removed from first fiber member 20. Ends 29 of fiber member 20 can be cut to the same size or length and can be clamped or otherwise held in place during densification to limit movement of fiber plies 24 and the tendency of fiber plies 24 that have been depressed from returning to their original shape during densification. In some embodiments, a preceramic polymer, polymer that chars to carbon (e.g., phenolic polymer), or a mixture of fillers and binders can be used to maintain the pressed geometry of channels 26 during densification.

Figure 3:
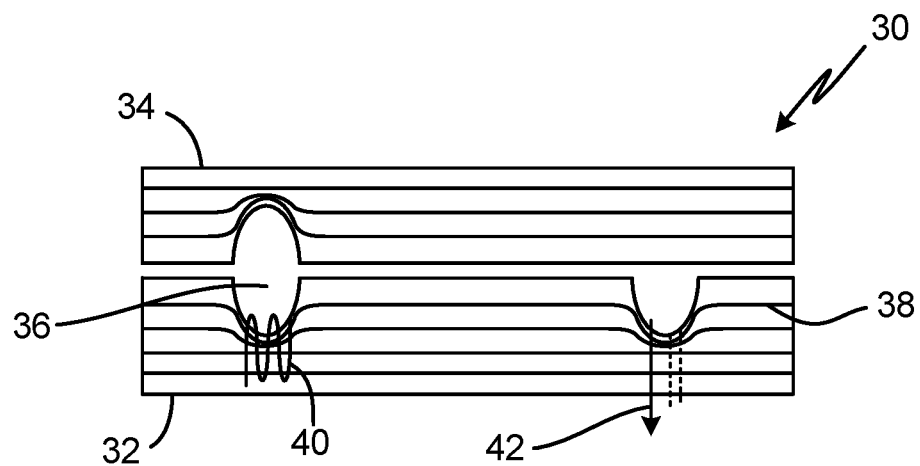
FIG. 3 is an embodiment of a fiber preform with cooling channels maintained by stitching and needling.

FIG. 3 provides a schematic view of one embodiment of near net shape fiber preform 30 having first fiber member 32, second fiber member 34, and channels 36. First and second fiber members 32, 34 can be formed from a plurality of 2D fiber plies 38 or 3D weave as discussed with respect to FIGS. 1 and 2. One or more channels 36 can be formed in one or both fiber members 32, 34. Channels 36 can be formed by a mold (not shown) as described with respect to FIG. 2. First fiber member 32 and second fiber member 34 can be formed separately and then assembled to align channels 36. Alternatively, channels 36 can be pressed into first and second fiber members 32, 34 simultaneously with a temporary mold (e.g., large diameter nylon), which can be burned out or otherwise removed during or following densification.

As illustrated in FIG. 3, stitching or needling can be used to maintain channels 36. One or more fibers 40 can be used to stitch plies together in channel 36. Fibers 40 can be SiC fiber, carbon fiber, polymer fiber that can be removed with solvent or thermal treatment, or other temporary or permanent fiber material. Alternatively, a barbed needle 42 can be pulled through plies 38 to catch and consolidate plies 38 in channel 36 by breaking fibers in plane and drawing fibers through the surface. In some embodiments, loose fibers can be placed on the surface the barbed needle enters or on one or more inner plies to provide a tougher fiber for drawing through the preform. In some embodiments, stitching or needling can be used to form channels 36 without the use of a mold for pressing channels 36. Although stitching and needling can be used in conjunction, the combination illustrated in FIG. 3 is simply intended to show alternative methods.

Figure 4:
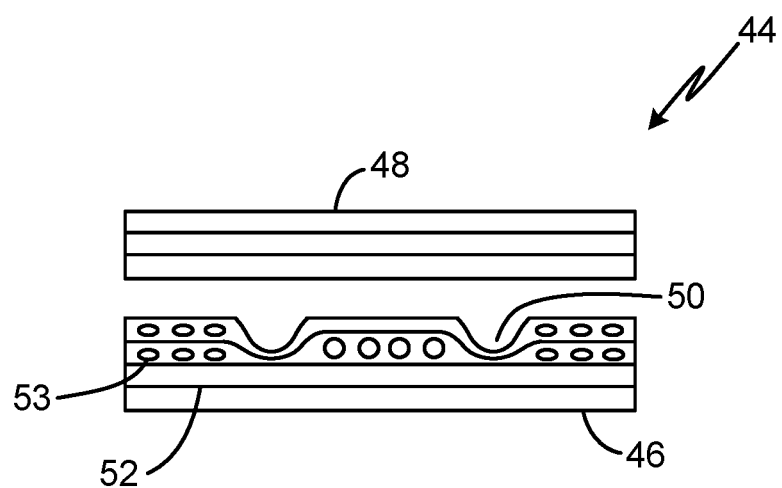
FIG. 4 is a schematic view of another embodiment of a fiber preform with cooling channels.

FIG. 4 provides a schematic of fiber preform 44 having first fiber member 46, second fiber member 48, and channels 50. First and second fiber members 46, 48 can be formed from a plurality of 2D fiber plies 52 or 3D weave as previously discussed. One or more channels 50 can be formed in one or both fiber members 46, 48 as described with respect to FIGS. 2 and 3. As illustrated in FIG. 4, one or more fiber tows 53 can be removed or left out of the 2D fiber ply 52 or 3D weave in the area of one or more channels 50 to reduce the number of fiber tows under channels 50 and to form a depression in first fiber member 50. Alternatively, or in combination with dropping fiber tows, channels 50 can be formed by adding multiple fiber tows (e.g., twisted or braided tows) or tows of higher denier and/or larger size to positions adjacent to desired locations of channels 50 to build up channel walls. FIG. 4 is a simplified schematic intending to illustrate fiber tows 53 arranged at right angles to other fiber tows in the woven ply 52 or 3D weave. In some embodiments, first fiber member 46 can have a plurality of stacked woven fiber sheets in which individual fiber tows have been removed or left out in the weaving process to provide channels 50. First fiber member 46 can be partially or fully densified before assembly with second fiber member 48 or can be undensified upon assembly. Stitching, needling, pressing, or combinations thereof can be used to maintain channels 50 during densification as previously discussed.

Figure 5:
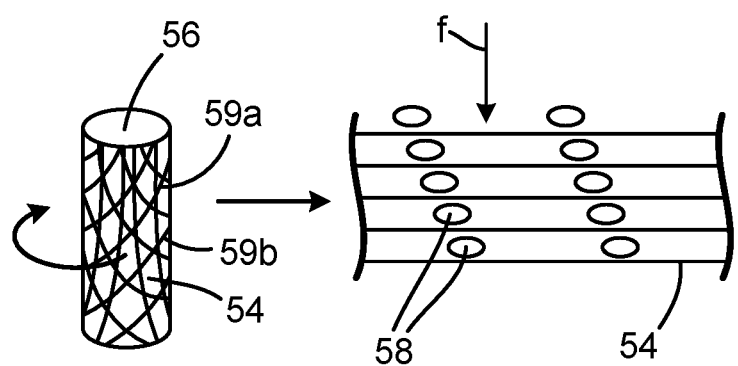
FIG. 5 is a schematic view of an embodiment of a braided fiber member with cooling channels.

FIG. 5 provides a schematic view of first fiber member 54 formed by a plurality of braided fiber tubes or sheets. In some embodiments, braided fiber tubes can be formed on a mandrel 56 that is rotated during the braiding process. Rotation of the mandrel can provide the braided fiber tube with helical shaped protrusions 58 formed by axial or biased fibers with depressions therebetween, which can form channels. First fiber member 54 can be made of a plurality of braided fiber tubes or braided fiber sheets. Braids can be biaxial or triaxial. Mandrel 56 can be rotated or moved axially during the braiding process to support creation of varying helical and straight shapes. In some embodiments, to create the helical shapes, multiple fiber tows (e.g., twisted or braided tows) or tows of higher denier and/or larger size are selectively positioned in bias or axial sites to build up channel walls. For example, biased fiber tows 59a can include additional or larger fiber tows than biased fiber tows 59b to form channels between the built-up biased fiber tows 59a. Not all fiber sites would need to be built up in this manner. Fiber sites can be selected based on the size of channels desired. In some cases rotation of the mandrel is not necessary to form the channels. Alternatively or in addition, mandrel 56 can be shaped to create channels. A mold (not shown) can be used to locally apply a pressing force f (indicated by arrow) to further form and maintain channels. Stitching, needling, and addition of polymer or other binder material can also or alternatively be used to form and maintain channels 56.

Figure 6:
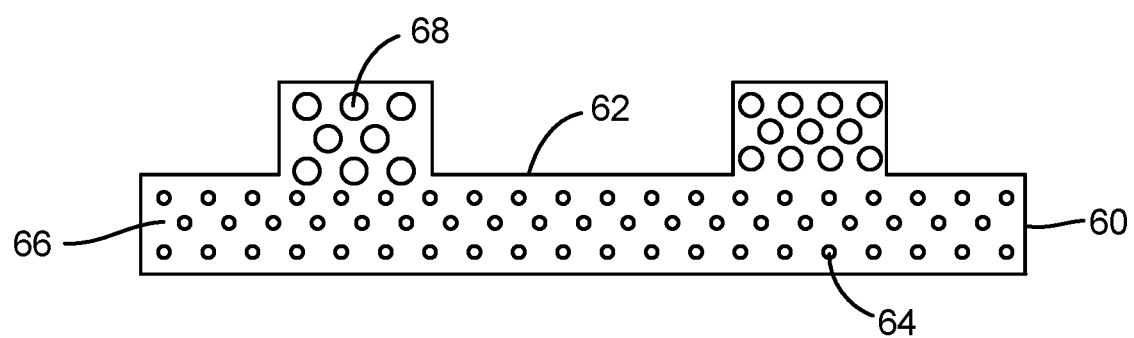
FIG. 6 is a schematic view of an embodiment of a preimpregnated fiber member formed with cooling channels While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

FIG. 6 provides a schematic view of an embodiment of a preimpregnated first fiber member 60 formed with cooling channels 62. A prepreg, consisting of unidirectional or multidirectional fiber tows 64 disposed in a matrix material 66, can be fabricated to form first fiber member 60 with integral cooling channels 62. Additional fiber tows can be added locally in a layup process to change a thickness of the prepreg forming one or more channels 62 between areas of increased thickness. A roller (not shown) having protrusions lined up with channels 62 can be used to allow a geometry of the fibers to persist once matrix material is added or encourage and shape a desired channel 62 geometry. Roller design and fiber placement can be tailored to provide cooling channels 62 of differing depths, thicknesses, and arrangement.

In some embodiments, larger sized or fiber tows 68 of higher denier or ceramic particulates can be added to increase bulk around channels. Although described with respect to FIG. 6, particulate material can be incorporated in any of the foregoing disclosed embodiments to build up thicknesses or channel walls. Fiber tows 68 can also include braided or twisted fiber tows, which can be used to improve fiber shape and placement control. Alternatively, additional matrix material (absent fibers) can be coextruded with a fiber sheet for form raised areas with channels 62 therebetween.

First fiber member 60 can be assembled with a second fiber member having the same shape with channels 62 in first fiber member 60 aligned with and facing channels of the second fiber member. Alternatively, a standard unshaped or flat prepreg sheet can be used cover channels 62 or a second fiber member with channels that do not align with channels 62 can be used to cover channels 62. The resulting near net shape fiber preform can be densified according to the method disclosed in FIG. 1.

SUMMATION

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

DISCUSSION OF POSSIBLE EMBODIMENTS

The following are non-exclusive descriptions of possible embodiments of the present invention.

A method for forming a ceramic matrix composite (CMC) component with an internal cooling channel includes, among other possible things, forming a first fiber member, forming a first depression in a surface of the first fiber member, covering the first depression with a second fiber member to form a near-net shape fiber preform of a component with an internal channel defined in part by the first depression, and densifying the fiber preform.

The method of the preceding paragraph can optionally include, additionally and/or alternatively, any one or more of the following features, configurations, additional components, and/or steps:

The first depression can be formed by pressing the first fiber member, wherein pressing comprises applying a force to the first fiber member with a shaped tool comprising a protrusion matching a shape of the first depression.

The fiber preform can be densified with the shaped tool positioned on the first fiber member.

The method of any of the preceding paragraphs can further include applying a binder material to the first fiber member to maintain a shape of the first depression.

The method of any of the preceding paragraphs can further include stitching the first fiber member with a fiber tow to maintain a shape of the first depression.

The method of any of the preceding paragraphs can further include passing a barbed needle through the first fiber member to maintain a shape of the first channel.

The method of any of the preceding paragraphs can further include forming a second depression in a surface of the second fiber member, wherein covering the first depression with the second fiber member includes aligning the first depression with the second depression.

The method of any of the preceding paragraphs can further include forming a second depression in a surface of the second fiber member, wherein covering the first depression with the second fiber member includes offsetting the first depression from the second depression.

The first and second fiber members can each include a plurality of fiber plies and forming the first depression can cause ends of the plurality of fiber plies to be displaced inward toward the first depression. The ends can be constrained from moving during densification.

The method of any of the preceding paragraphs can further include increasing a bond between the first and second fiber members. Increasing the bond can include applying material between contacting surfaces of the first and second fiber members. The material can be selected from a group consisting of: chopped fibers, a pre-ceramic polymer adhesive, and combinations thereof.

Forming the first fiber member can include reducing an amount of fiber tows in a region of the first depression such that a region adjacent to the first depression has a greater amount of fiber tows than under the first depression.

Forming the first fiber member can include providing additional fiber tows on either side of a location of the first depression.

The first fiber member can be a prepreg and forming the first depression can include pressing the first fiber member with a roller having a protrusion in a shape of the first depression that presses between the additional fiber tows.

The additional fiber tows can have a larger diameter than a plurality of fiber tows disposed under the first depression.

The additional fiber tows can be braided or twisted fiber tows.

Forming the first fiber member can include braiding the fiber tows on a mandrel and forming helical protrusions with the first depression being formed between the helical protrusions.

The mandrel can be rotated to control positions of the helical protrusions.

Forming the first depression can include applying a force to an area between the helical protrusions with a shaped tool comprising a protrusion matching a shape of the first depression.

Forming the first fiber member according to any of the preceding paragraphs can include braiding the fiber tows on a mandrel, wherein at least one of an axial fiber site or a biased fiber site comprises additional or larger fiber tows.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for forming a ceramic matrix composite (CMC) component with an internal cooling channel, the method comprising:
    forming a first fiber member;
    forming a first depression in a surface of the first fiber member by applying a force to the first fiber member with a shaped tool comprising a protrusion matching a shape of the first depression;
    maintaining a shape of the first depression by at least one of:
        applying a binder material to the first fiber member;
        stitching the first fiber member with a fiber tow; and
        passing a barbed needle through the first fiber member;
    covering the first depression with a second fiber member to form a near-net shape fiber preform of a component with an open internal channel defined in part by the first depression; and
    densifying the fiber preform.

2. The method of claim 1 and further comprising forming a second depression in a surface of the second fiber member, and wherein covering the first depression with the second fiber member comprises aligning the first depression with the second depression.

3. The method of claim 1 and further comprising forming a second depression in a surface of the second fiber member, and wherein covering the first depression with the second fiber member comprises offsetting the first depression from the second depression.

4. The method of claim 1, wherein the first and second fiber members each comprise a plurality of fiber plies and wherein forming the first depression causes ends of the plurality of fiber plies to be displaced inward toward the first depression, and wherein ends are constrained from moving during densification.

5. The method of claim 1 and further comprising increasing a bond between the first and second fiber members, wherein increasing the bond comprises applying material between contacting surfaces of the first and second fiber members, the material selected from a group consisting of: chopped fibers, a pre-ceramic polymer adhesive, and combinations thereof.

6. The method of claim 1, wherein forming the first fiber member comprises reducing an amount of fiber tows in a region of the first depression such that a region adjacent to the first depression has a greater amount of fiber tows than under the first depression.

7. The method of claim 1, wherein forming the first fiber member comprises providing additional or larger fiber tows on either side of a location of the first depression.

8. The method of claim 7, wherein the additional fiber tows have a larger diameter than a plurality of fiber tows disposed under the first depression.

9. The method of claim 7, wherein the additional fiber tows are braided or twisted fiber tows.

10. The method of claim 1, wherein maintaining the shape of the first depression includes stitching the first fiber member with a fiber tow.

11. The method of claim 1, wherein maintaining the shape of the first depression includes passing a barbed needle through the first fiber member.

12. A method for forming a ceramic matrix composite (CMC) component with an internal cooling channel, the method comprising:
   forming a first fiber member, wherein the first fiber member is a prepreg;
   forming a first depression in a surface of the first fiber member, wherein forming the depression comprises:
      providing additional or larger fiber tows on either side of a location of the first depression; and
      pressing the first fiber member with a roller having a protrusion in a shape of the first depression that presses between the additional or larger fiber tows;
   covering the first depression with a second fiber member to form a near-net shape fiber preform of a component with an internal channel defined in part by the first depression; and
   densifying the fiber preform.

13. The method of claim 12, wherein the additional fiber tows have a larger diameter than a plurality of fiber tows disposed under the first depression.

14. The method of claim 12, wherein the additional fiber tows are braided or twisted fiber tows.

15. A method for forming a ceramic matrix composite (CMC) component with an internal cooling channel, the method comprising:
   forming a first fiber member, wherein forming the first fiber member comprises:
      braiding fiber tows on a mandrel; and
      forming helical protrusions, wherein a first depression is formed between the helical protrusions;
   forming a first depression in a surface of the first fiber member;
   covering the first depression with a second fiber member to form a near-net shape fiber preform of a component with an internal channel defined in part by the first depression; and
   densifying the fiber preform.

16. The method of claim 15, and further comprising rotating the mandrel to control positions of the helical protrusions.

17. The method of claim 15, wherein forming the first depression comprises applying a force to an area between the helical protrusions with a shaped tool comprising a protrusion matching a shape of the first depression.

18. The method of claim 15, wherein forming the first fiber member comprises braiding the fiber tows on a mandrel, wherein at least one of an axial fiber site or a biased fiber site comprises additional or larger fiber tows.

* * * * *